(12) United States Patent
Hartz et al.

(10) Patent No.: US 9,051,409 B2
(45) Date of Patent: Jun. 9, 2015

(54) USE OF POLYURETHANE ADHESIVE FORMED FROM POLYESTER DIOLS, POLYETHER DIOLS AND SILANE COMPOUNDS IN THE MANUFACTURE OF FILM/FOIL-COATED FURNITURE

(75) Inventors: Oliver Hartz, Limburgerhof (DE); Axel Weiss, Speyer (DE); Karl-Heinz Schumacher, Neustadt (DE); Axel Meyer, Heidelberg (DE); Oral Aydin, Mannheim (DE)

(73) Assignee: BASF SE, Ludwigshafen (DE)

( * ) Notice: Subject to any disclaimer, the term of this patent is extended or adjusted under 35 U.S.C. 154(b) by 587 days.

(21) Appl. No.: 13/259,005

(22) PCT Filed: Mar. 30, 2010

(86) PCT No.: PCT/EP2010/054143
§ 371 (c)(1),
(2), (4) Date: Sep. 22, 2011

(87) PCT Pub. No.: WO2010/118949
PCT Pub. Date: Oct. 21, 2010

(65) Prior Publication Data
US 2012/0015193 A1 Jan. 19, 2012

(30) Foreign Application Priority Data
Apr. 14, 2009 (EP) .................................... 09157866

(51) Int. Cl.
| | |
|---|---|
| C09J 183/08 | (2006.01) |
| B32B 21/02 | (2006.01) |
| B32B 37/12 | (2006.01) |
| C08G 18/08 | (2006.01) |
| B32B 7/12 | (2006.01) |
| B32B 21/08 | (2006.01) |
| C08G 18/00 | (2006.01) |
| C08G 18/32 | (2006.01) |
| C08G 18/48 | (2006.01) |
| C08G 18/66 | (2006.01) |
| C08G 18/73 | (2006.01) |
| C08G 18/83 | (2006.01) |
| C09J 175/06 | (2006.01) |

(52) U.S. Cl.
CPC .............. *C08G 18/0823* (2013.01); *B32B 7/12* (2013.01); *B32B 21/08* (2013.01); *C08G 18/003* (2013.01); *C08G 18/3234* (2013.01); *C08G 18/4854* (2013.01); *C08G 18/6692* (2013.01); *C08G 18/73* (2013.01); *C08G 18/837* (2013.01); *C08G 2170/80* (2013.01); *C09J 175/06* (2013.01)

(58) Field of Classification Search
CPC ......... C09J 183/08; B32B 21/02; B32B 37/12
USPC ............. 156/329, 331.7; 428/425.1; 524/588; 523/122
See application file for complete search history.

(56) References Cited

U.S. PATENT DOCUMENTS

| | | | |
|---|---|---|---|
| 6,325,887 B1 | 12/2001 | Amirsakis | |
| 2006/0183845 A1 | 8/2006 | Harada et al. | |
| 2008/0023193 A1* | 1/2008 | O'Brien | 166/179 |
| 2008/0026193 A1* | 1/2008 | Koppes et al. | 428/207 |
| 2009/0056873 A1 | 3/2009 | Schumacher et al. | |
| 2009/0194232 A1* | 8/2009 | Schumacher et al. | 156/329 |

FOREIGN PATENT DOCUMENTS

| | | |
|---|---|---|
| EP | 0 953 623 | 11/1999 |
| JP | 11092743 A * | 4/1999 |
| JP | 2003-89715 A | 3/2003 |
| JP | 2005 272592 | 10/2005 |
| WO | 2007 082826 | 7/2007 |
| WO | 2008 006733 | 1/2008 |

OTHER PUBLICATIONS

Machine translation of JP 11092743 A, retrieved Feb. 22, 2014.*
Office Action issued Nov. 25, 2013, in Japanese Patent Application No. 2012-505111 English translation only.
International Search Report Issued Oct. 14, 2010 in PCT/EP10/054143 Filed Mar. 30, 2010.
U.S. Appl. No. 13/258,479, filed Sep. 22, 2011, Hartz, et al.

* cited by examiner

*Primary Examiner* — Daniel Lee
(74) *Attorney, Agent, or Firm* — Oblon, McClelland, Maier & Neustadt, L.L.P.

(57) ABSTRACT

The present invention relates to the use of a polyurethane adhesive in the manufacture of film/foil-coated furniture. The adhesive consists of two components, the first component comprising at least two different polyurethanes which comprise carboxyl groups, and the polyurethanes comprising units derived from polyester diols and units derived from polyether diols, the weight quantity ratio of the sum total of all units derived from polyester diols to the sum total of all units derived from polyether diols being in the range from 1:9 to 9:1, and the second component comprising at least one silane compound reactive toward carboxyl groups.

11 Claims, No Drawings

USE OF POLYURETHANE ADHESIVE FORMED FROM POLYESTER DIOLS, POLYETHER DIOLS AND SILANE COMPOUNDS IN THE MANUFACTURE OF FILM/FOIL-COATED FURNITURE

The present invention relates to the use of a polyurethane adhesive in the manufacture of film/foil-coated furniture. The adhesive consists of two components, the first component comprising at least two different polyurethanes which comprise carboxyl groups, and the polyurethanes comprising units derived from polyester diols and units derived from polyether diols, the weight quantity ratio of the sum total of all units derived from polyester diols to the sum total of all units derived from polyether diols being in the range from 1:9 to 9:1, and the second component comprising at least one silane compound reactive toward carboxyl groups.

The manufacture of film/foil-coated furniture or furniture parts involves suitable polymeric films being permanently applied to shaped bodies of plastic, metal, wood, woodbase or fiber materials, for example, by means of an adhesive. The adhesive used generally comprises aqueous dispersion-based adhesives based on polyurethanes. Isocyanates have often been employed as crosslinkers for the purposes of improving the performance characteristics. Isocyanate-free systems are desired. WO 2008/006733 discloses aqueous polyurethane adhesives comprising silane additives. Known adhesive dispersions are not yet optimal in every respect, particularly in respect of the activation temperature required to thermally activate the adhesive, which is relatively high for known adhesives based on polyurethane dispersions. High activation temperatures are particularly problematic when heat-sensitive substrates or very thin and consequently particularly heat-sensitive films/foils are to be used.

An object of the invention was to improve further the performance properties of polyurethane dispersions for industrial lamination of furniture, particularly in respect of an optimized activation temperature for the adhesive. At the same time, however, the adhesive bonds formed shall also possess good heat resistance.

The present invention provides for the use of an adhesive consisting of a first, aqueous component and of a second component in the manufacture of film/foil-coated furniture, the first component comprising at least one first polyurethane and at least one second polyurethane other than the first polyurethane, the first polyurethane comprising units derived from polyester diols and the second polyurethane comprising units derived from polyether diols, and at least one of the two polyurethanes, preferably both polyurethanes, comprising carboxyl groups, the weight quantity ratio of the sum total of all units derived from polyester diols to the sum total of all units derived from polyether diols being in the range from 1:9 to 9:1, preferably in the range from 1:4 to 4:1 and more preferably in the range from 1:1 to 4:1 and the second component comprising at least one silane compound reactive toward carboxyl groups.

The present invention also provides for the use of a polyurethane with units derived from polyether diols, for lowering the activation temperature of heat-activatable adhesives. When polyurethanes with units derived from polyether diols are used according to the present invention, it is particularly simple to control the activation temperature of heat-activatable adhesives. This is particularly advantageous in relation to film/foil lamination using heat-sensitive films/foils or in relation to heat-sensitive substrates.

In one embodiment, the units derived from polyester diols and the units derived from polyether diols are present in different polyurethanes; in other words, the adhesive comprises at least two different types of polyurethanes. The first component of the adhesive may comprise (a) 20-80 parts by weight, preferably 40-70 parts by weight, of at least one first polyurethane with units derived from polyester diols and without units derived from polyether diols, (b) 10-70 parts by weight, preferably 20-50 parts by weight, of at least one second polyurethane with units derived from polyether diols and without units derived from polyester diols, and c) 0-60 parts by weight, preferably 0 to 30, for example 10 to 30, parts by weight of further polymers other than polyurethanes, for example polyvinyl acetate, ethylene-vinyl acetate copolymers, polyacrylate copolymer dispersions or styrene-butadiene dispersions.

Preferably the first polyurethane is synthesized from a) diisocyanates,
b) polyester diols having a molar weight of greater than 500 to 5000 g/mol,
c) diols containing carboxylic acid groups, and
d) optionally further, non-a)-c), monofunctional or polyfunctional compounds having reactive groups selected from alcoholic hydroxyl groups, primary amino groups, secondary amino groups, and isocyanate groups.

Preferably, the second polyurethane is synthesized from a) diisocyanates,
b) polyether diols having a molar weight of 240 to 5000 g/mol,
c) diols containing carboxylic acid groups, and
d) optionally further, non-a)-c), monofunctional or polyfunctional compounds having reactive groups selected from alcoholic hydroxyl groups, primary amino groups, secondary amino groups, and isocyanate groups.

Preferably the polyether diols are selected from polytetrahydrofuran and polypropylene oxide. Preferably the polyester diols are selected from reaction products of dihydric alcohols with dibasic carboxylic acids, and lactone-based polyester diols.

Preferably the polyurethanes are each synthesized from at least 40%, more preferably at least 60%, and very preferably at least 80% by weight of diisocyanates, polyether diols and/or polyester diols. Preferably the first polyurethane contains polyester diols in an amount of more than 10%, more preferably greater than 30%, in particular greater than 40% or greater than 50%, with very particular preference greater than 60%, by weight, based on the first polyurethane. With preference the second polyurethane contains polyether diols in an amount of more than 10%, more preferably greater than 30%, in particular greater then 40% or greater than 50%, with very particular preference greater than 60%, by weight, based on the second polyurethane.

The use according to any of the preceding claims, wherein the first polyurethane is crystalline in the pure state and has a melting point in the range from 30 to 150° C., and the second polyurethane may be amorphous.

Preferably at least the first polyurethane is crystalline in the pure state. The first polyurethane preferably has a melting point of greater than 30° C., more particularly greater than 40° C., with particular preference greater than 50° C. or else greater than 60 or greater than 70° C.; generally speaking the melting point is not greater than 150° C., more particularly not greater than 100° C. The melting point is therefore situated more particularly in the range from 30 to 150° C., more preferably from 40 to 150, and very preferably from 50 to 100° C., and in particular from 50 to 80° C. The second polyurethane may be amorphous in the pure state. At least the first polyurethane preferably has an enthalpy of fusion of more than 20 J/g. The melting point and the enthalpy of fusion are measured by the method of differential scanning calorimetry. The measurement is made on polyurethane films with a thickness of 200 μm, which prior to measurement have been dried in a forced-air drying cabinet at 40° C. for 72 hours. In preparation for measurement, approximately 13 mg of the polyurethane are placed in pans. The pans are sealed, the samples are heated to 120° C., and then are cooled at 20 K/min and conditioned at 20° C. for 20 hours. The samples thus prepared are measured by the DSC method in accordance with DIN 53765, the sample being heated at 20 K/min. The melting temperature is evaluated as being the peak temperature in accordance with DIN 53765; the enthalpy of fusion is determined as in FIG. 4 of DIN 53765.

Suitable diisocyanates are, for example, those of the formula X(NCO)2, where X is an aliphatic hydrocarbon radical having 4 to 15 C atoms, a cycloaliphatic or aromatic hydrocarbon radical having 6 to 15 C atoms, or an araliphatic hydrocarbon radical having 7 to 15 C atoms. Examples of such diisocyanates include tetramethylene diisocyanate, hexamethylene diisocyanate, dodecamethylene diisocyanate, 1,4-diisocyanatocyclohexane, 1-isocyanato-3,5,5-trimethyl-5-isocyanatomethylcyclohexane (IPDI), 2,2-bis(4-isocyanatocyclohexyl)propane, trimethylhexane diisocyanate, 1,4-diisocyanatobenzene, 2,4-diisocyanatotoluene, 2,6-diisocyanatotoluene, 4,4'-diisocyanatodiphenylmethane, 2,4'-diisocyanatodiphenylmethane, p-xylylene diisocyanate, tetramethylxylylene diisocyanate (TMXDI), the isomers of bis(4-isocyanatocyclohexyl)methane (HMDI) such as the trans/trans, the cis/cis, and the cis/trans isomers, and mixtures of these compounds. Diisocyanates of this kind are available commercially.

Particularly important mixtures of these isocyanates are the mixtures of the respective structural isomers of diisocyanatotoluene and diisocyanatodiphenylmethane; the mixture of 80 mol % 2,4-diisocyanatotoluene and 20 mol % 2,6-diisocyanatotoluene is particularly suitable. Also of particular advantage are the mixtures of aromatic isocyanates such as 2,4-diisocyanatotoluene and/or 2,6-diisocyanatotoluene with aliphatic or cycloaliphatic isocyanates such as hexamethylene diisocyanate or IPDI, in which case the preferred mixing ratio of the aliphatic to the aromatic isocyanates is 1:9 to 9:1, more particularly 1:4 to 4:1.

Compounds that can be used to synthesize the polyurethanes, in addition to those mentioned above, also include isocyanates which in addition to the free isocyanate groups carry further, blocked isocyanate groups, e.g., uretdione groups.

With a view to effective film-forming and elasticity, suitable polyester diols and polyether diols are principally relatively high molecular weight diols, having a molecular weight above 500 and up to 5000, preferably from about 1000 to 3000 g/mol. The molecular weight in question is the number-average molar weight Mn. Mn is obtained by determining the number of end groups (OH number).

Polyester diols are known, for example, from Ullmanns Enzyklopädie der technischen Chemie, 4th edition, volume 19, pp. 62 to 65. It is preferred to use polyester diols which are obtained by reacting dihydric alcohols with dibasic carboxylic acids. Instead of the free polycarboxylic acids it is also possible to use the corresponding polycarboxylic anhydrides or corresponding polycarboxylic esters of lower alcohols or mixtures thereof to prepare the polyesterpolyols. The polycarboxylic acids can be aliphatic, cycloaliphatic, araliphatic, aromatic or heterocyclic and can, if appropriate, be substituted, by halogen atoms for example, and/or unsaturated. Examples thereof include the following: suberic acid, azelaic acid, phthalic acid, isophthalic acid, phthalic anhydride, tetrahydrophthalic anhydride, hexahydrophthalic anhydride, tetrachlorophthalic anhydride, endomethylenetetrahydrophthalic anhydride, glutaric anhydride, maleic acid, maleic anhydride, fumaric acid, and dimeric fatty acids.

Preferred dicarboxylic acids are those of the general formula HOOC—(CH2)y-COOH, where y is a number from 1 to 20, preferably an even number from 2 to 20, examples being succinic acid, adipic acid, sebacic acid, and dodecanedicarboxylic acid.

Examples of suitable dihydric alcohols include ethylene glycol, propane-1,2-diol, propane-1,3-diol, butane-1,3-diol, butene-1,4-diol, butyne-1,4-diol, pentane-1,5-diol, neopentyl glycol, bis(hydroxymethyl)cyclohexanes such as 1,4-bis(hydroxymethyl)-cyclohexane, 2-methylpropane-1,3-diol, methylpentanediols, and also diethylene glycol, triethylene glycol, tetraethylene glycol, polyethylene glycol, dipropylene glycol, polypropylene glycol, dibutylene glycol and polybutylene glycols. Preferred alcohols are those of the general formula HO—(CH2)x-OH, where x is a number from 1 to 20, preferably an even number from 2 to 20. Examples of such alcohols include ethylene glycol, butane-1,4-diol, hexane-1,6-diol, octane-1,8-diol, and dodecane-1,12-diol. Preference is also given to neopentyl glycol.

Further to the polyester diols or to the polyether diols it is also possible, if desired, to use polycarbonatediols as well, such as may be obtained, for example, by reacting phosgene with an excess of the low molecular weight alcohols specified as synthesis components for the polyesterpolyols.

It is possible, if desired, to use lactone-based polyester diols, which are homopolymers or copolymers of lactones, preferably hydroxy-terminated adducts of lactones with suitable difunctional starter molecules. Preferred lactones are those derived from compounds of the general formula HO—(CH2)z-COOH, where z is a number from 1 to 20 and where one hydrogen atom of a methylene unit may also be substituted by a $C_1$ to $C_4$ alkyl radical. Examples are ε-caprolactone, β-propiolactone, γ-butyrolactone and/or methyl-ε-caprolactone, and mixtures thereof. Examples of suitable starter components are the low molecular weight dihydric alcohols specified above as a synthesis component for the polyesterpolyols. The corresponding polymers of ε-caprolactone are particularly preferred. Lower polyester diols or polyether diols as well can be used as starters for preparing the lactone polymers. Instead of the polymers of lactones it is also possible to use the corresponding chemically equivalent polycondensates of the hydroxycarboxylic acids corresponding to the lactones.

Polyetherdiols are obtainable in particular by polymerizing ethylene oxide, propylene oxide, butylene oxide, tetrahydrofuran, styrene oxide or epichlorohydrin with itself, in the presence of $BF_3$ for example, or by subjecting these compounds, if appropriate in a mixture or in succession, to addition reaction with starter components containing reactive hydrogen atoms, such as alcohols or amines, examples being water, ethylene glycol, propane-1,2-diol, propane-1,3-diol, 2,2-bis(4-hydroxyphenyl)propane, and aniline. Particular preference is given to polypropylene oxide, polytetrahydrofuran with a molecular weight of 240 to 5000, and in particular 500 to 4500. Preferred polyether diols are those composed to an extent of less than 20% by weight of ethylene oxide.

It is also possible, if desired, to use polyhydroxyolefins as well, preferably those having 2 terminal hydroxyl groups, e.g., α,ω-dihydroxypolybutadiene, α,ω-dihydroxypolymethacrylic esters or α,ω-dihydroxypolyacrylic esters, as monomers (c1). Such compounds are known for example from EP-A 622 378. Further suitable polyols are polyacetals, polysiloxanes, and alkyd resins.

The hardness and the elasticity modulus of the polyurethanes can be increased if necessary by using as diols not only the polyester diols and/or not only the polyether diols but also different, monomeric, low molecular weight diols having a molecular weight of from about 60 to 500, preferably from 62 to 200 g/mol. Low molecular weight monomeric diols used are in particular the synthesis components of the short-chain alkanediols specified for preparing polyesterpolyols, preference being given to unbranched diols having 2 to 12 carbon atoms and an even number of carbon atoms, and also to pentane-1,5-diol and neopentyl glycol. Examples are ethylene glycol, propane-1,2-diol, propane-1,3-diol, butane-1,3-diol, butene-1,4-diol, butyne-1,4-diol, pentane-1,5-diol, neopentyl glycol, bis(hydroxymethyl)cyclohexanes such as 1,4-bis(hydroxymethyl)cyclohexane, 2-methylpropane-1,3-diol, methylpentanediols, additionally diethylene glycol, triethylene glycol, tetraethylene glycol, polyethylene glycol, dipropylene glycol, polypropylene glycol, dibutylene glycol, and polybutylene glycols. Preference is given to alcohols of the general formula $HO—(CH_2)_x—OH$, where x is a number from 1 to 20, preferably an even number from 2 to 20. Examples thereof are ethylene glycol, butane-1,4-diol, hexane-1,6-diol, octane-1,8-diol, and dodecane-1,12-diol. Preference is further given to neopentyl glycol.

The fraction of polyester diols and of polyether diols, based on the total amount of all the diols, is preferably 10 to 100 mol %, and the fraction of the low molecular weight monomeric diols, based on the total amount of all the diols, is preferably 0 to 90 mol %. With particular preference the ratio of the polymeric diols to the monomeric diols is 0.1:1 to 5:1, more preferably 0.2:1 to 2:1.

In order to make the polyurethanes dispersible in water they may additionally comprise as synthesis components monomers which carry at least one isocyanate group or at least one group reactive toward isocyanate groups and, furthermore, at least one hydrophilic group or a group which can be converted into a hydrophilic group. In the text below the term "hydrophilic groups or potentially hydrophilic groups" is abbreviated to "(potentially) hydrophilic groups". The (potentially) hydrophilic groups react with isocyanates at a substantially slower rate than do the functional groups of the monomers used to synthesize the polymer main chain. The fraction of the components having (potentially) hydrophilic groups among the total quantity of all the synthesis components of the polyurethanes is generally made such that the molar amount of the (potentially) hydrophilic groups, based on the amount by weight of all of the monomers, is 30 to 1000, preferably 50 to 500, and more preferably 80 to 300 mmol/kg.

The (potentially) hydrophilic groups can be nonionic or, preferably, (potentially) ionic hydrophilic groups. Particularly suitable nonionic hydrophilic groups are polyethylene glycol ethers composed of preferably 5 to 100, more preferably 10 to 80 repeating ethylene oxide units. The amount of polyethylene oxide units is generally from 0 to 10% by weight, preferably from 0 to 6% by weight, based on the amount by weight of all the monomers. Preferred monomers containing nonionic hydrophilic groups are polyethylene oxide diols containing at least 20% by weight of ethylene oxide, polyethylene oxide monools, and the reaction products of a polyethylene glycol and a diisocyanate which carry a terminally etherified polyethylene glycol radical. Diisocyanates of this kind and processes for preparing them are specified in patents U.S. Pat. No. 3,905,929 and U.S. Pat. No. 3,920,598.

Ionic hydrophilic groups are, in particular, anionic groups such as the sulfonate, the carboxylate, and the phosphate group in the form of their alkali metal salts or ammonium salts, and also cationic groups such as ammonium groups, especially protonated tertiary amino groups or quaternary ammonium groups. Potentially ionic hydrophilic groups are, in particular, those which can be converted into the above-mentioned ionic hydrophilic groups by simple neutralization, hydrolysis or quaternization reactions, in other words, for example, carboxylic acid groups or tertiary amino groups. (Potentially) ionic monomers are described at length in, for example, Ullmanns Enzyklopädie der technischen Chemie, 4th edition, volume 19, pp. 311-313 and in, for example, DE-A 1 495 745.

Of particular practical importance as (potentially) cationic monomers are, in particular, monomers containing tertiary amino groups, examples being tris(hydroxyalkyl)amines, N,N'-bis(hydroxyalkyl)alkylamines, N-hydroxyalkyldialkylamines, tris(aminoalkyl)amines, N,N'-bis(aminoalkyl)alkylamines, and N-aminoalkyldialkyl-amines, the alkyl radicals and alkanediyl units of these tertiary amines consisting independently of one another of 1 to 6 carbon atoms. Also suitable are polyethers containing tertiary nitrogen atoms and preferably two terminal hydroxyl groups, such as are obtainable in a conventional manner, for example, by alkoxylating amines containing two hydrogen atoms attached to amine nitrogen, such as methylamine, aniline or N,N'-dimethylhydrazine. Polyethers of this kind generally have a molar weight of between 500 and 6000 g/mol. These tertiary amines are converted into the ammonium salts either with acids, preferably strong mineral acids such as phosphoric acid, sulfuric acid, hydrohalic acids, or strong organic acids, or by reaction with suitable quaternizing agents such as $C_1$ to $C_6$ alkyl halides or benzyl halides, e.g., bromides or chlorides.

Suitable monomers having (potentially) anionic groups normally include aliphatic, cycloaliphatic, araliphatic or aromatic carboxylic acids and sulfonic acids which carry at least one alcoholic hydroxyl group or at least one primary or secondary amino group. Preference is given to dihydroxyalkylcarboxylic acids, especially those having 3 to 10 carbon atoms, such as are also described in U.S. Pat. No. 3,412,054. Particular preference is given to compounds of the general formula (c1)

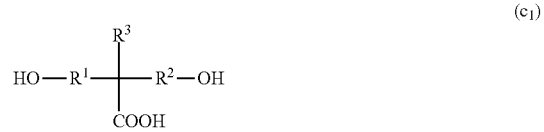

(c₁)

in which $R^1$ and $R^2$ are a $C_1$ to $C_4$ alkanediyl (unit) and $R^3$ is a $C_1$ to $C_4$ alkyl (unit), and especially to dimethylolpropionic acid (DMPA). Also suitable are corresponding dihydroxysulfonic acids and dihydroxyphosphonic acids such as 2,3-dihydroxypropanephosphonic acid.

Otherwise suitable are dihydroxyl compounds having a molecular weight of more than 500 to 10 000 g/mol and at least 2 carboxylate groups, which are known from DE-A 39 11 827. They are obtainable by reacting dihydroxyl compounds with tetracarboxylic dianhydrides such as pyromellitic dianhydride or cyclopentanetetracarboxylic dianhydride in a molar ratio of from 2:1 to 1.05:1 in a polyaddition reaction. Particularly suitable dihydroxyl compounds are the monomers (b2) cited as chain extenders and also the diols (b1).

At least one of the polyurethanes, preferably both the first and the second polyurethane, contain carboxyl groups. The carboxyl groups may be introduced into the polyurethanes by the aforementioned aliphatic, cycloaliphatic, araliphatic or aromatic carboxylic acids which carry at least one alcoholic hydroxyl group or at least one primary or secondary amino group. Dihydroxyalkylcarboxylic acids are preferred, especially those with 3 to 10 C atoms, more particularly dimethylolpropionic acid.

Further monomers containing amino groups reactive toward isocyanates include aminocarboxylic acids such as lysine, β-alanine or the adducts of aliphatic diprimary diamines with α,β-unsaturated carboxylic or sulfonic acids that are specified in DE-A 20 34 479. Such compounds obey, for example, the formula (c2)

$$H_2N—R^4—NH—R^5—X \quad (c2)$$

where $R^4$ and $R^5$ independently of one another are a $C_1$ to $C_6$ alkanediyl unit, preferably ethylene and X is COOH or $SO_3H$. Particularly preferred compounds of the formula (c2) are N-(2-aminoethyl)-2-aminoethanecarboxylic acid and also N-(2-aminoethyl)-2-aminoethanesulfonic acid and the corresponding alkali metal salts, with Na being a particularly preferred counterion. Also particularly preferred are the adducts of the abovementioned aliphatic diprimary diamines with 2-acrylamido-2-methylpropanesulfonic acid, as described for example in DE-B 1 954 090.

Where monomers with potentially ionic groups are used, their conversion into the ionic form may take place before, during or, preferably, after the isocyanate polyaddition, since the ionic monomers are frequently difficult to dissolve in the reaction mixture. Examples of neutralizing agents include ammonia, NaOH, triethanolamine (TEA), tri-isopropylamine (TIPA) or morpholine, or its derivatives. The sulfonate or carboxylate groups are particularly preferably in the form of their salts with an alkali metal ion or ammonium ion as counterion.

Polyfunctional monomers, which if desired are also constituents of the polyurethane, serve generally for crosslinking or chain extension. They generally comprise nonphenolic alcohols with a functionality of more than 2, amines having 2 or more primary and/or secondary amino groups, and compounds which as well as one or more alcoholic hydroxyl groups carry one or more primary and/or secondary amino groups. Alcohols having a functionality of more than 2, which may be used in order to set a certain degree of branching or crosslinking, include for example trimethylolpropane, glycerol, or sugars. Also suitable are monoalcohols which as well as the hydroxyl group carry a further isocyanate-reactive group, such as monoalcohols having one or more primary and/or secondary amino groups, monoethanolamine for example. Polyamines having 2 or more primary and/or secondary amino groups are used especially when the chain extension and/or crosslinking is to take place in the presence of water, since amines generally react more quickly than alcohols or water with isocyanates. This is frequently necessary when the desire is for aqueous dispersions of crosslinked polyurethanes or polyurethanes having a high molar weight. In such cases the approach taken is to prepare prepolymers with isocyanate groups, to disperse them rapidly in water, and then to subject them to chain extension or crosslinking by adding compounds having two or more isocyanate-reactive amino groups. Amines suitable for this purpose are generally polyfunctional amines of the molar weight range from 32 to 500 g/mol, preferably from 60 to 300 g/mol, which contain at least two amino groups selected from the group consisting of primary and secondary amino groups. Examples of such amines are diamines such as diaminoethane, diaminopropanes, diaminobutanes, diaminohexanes, piperazine, 2,5-dimethylpiperazine, amino-3-aminomethyl-3,5,5-trimethylcyclohexane (isophoronediamine, IPDA), 4,4'-diaminodicyclohexylmethane, 1,4-diaminocyclohexane, aminoethylethanolamine, hydrazine, hydrazine hydrate or triamines such as diethylenetriamine or 1,8-diamino-4-aminomethyloctane. The amines can also be used in blocked form, e.g., in the form of the corresponding ketimines (see for example CA-A 1 129 128), ketazines (cf. e.g. U.S. Pat. No. 4,269,748) or amine salts (see U.S. Pat. No. 4,292,226). Oxazolidines as well, as used for example in U.S. Pat. No. 4,192,937, represent blocked polyamines which can be used for the preparation of the polyurethanes of the invention, for chain extension of the prepolymers. Where blocked polyamines of this kind are used they are generally mixed with the prepolymers in the absence of water and this mixture is then mixed with the dispersion water or with a portion of the dispersion water, so that the corresponding polyamines are liberated by hydrolysis. It is preferred to use mixtures of diamines and triamines, more preferably mixtures of isophoronediamine (IPDA) and diethylenetriamine (DETA). The polyurethanes comprise preferably from 1 to 30 mol %, more preferably from 4 to 25 mol %, based on the total amount of all synthesis components, of a polyamine having at least 2 isocyanate-reactive amino groups. For the same purpose it is also possible to use isocyanates having a functionality of more than two. Examples of standard commercial compounds are the isocyanurate or the biuret of hexamethylene diisocyanate.

Monofunctional monomers, which are used as well if desired, are monoisocyanates, monoalcohols, and mono-primary and -secondary amines. Their fraction is generally not more than 10 mol %, based on the total molar amount of the monomers. These monofunctional compounds customarily carry further functional groups such as olefinic groups or carbonyl groups and serve to introduce into the polyurethane functional groups which facilitate the dispersing and/or the crosslinking or further polymer-analogous reaction of the polyurethane. Monomers suitable for this purpose include those such as isopropenyl-α,α-dimethylbenzyl isocyanate (TMI) and esters of acrylic or methacrylic acid such as hydroxyethyl acrylate or hydroxyethyl methacrylate.

Within the field of polyurethane chemistry it is general knowledge how the molecular weight of polyurethanes can be adjusted by selecting the proportions of the mutually reactive monomers and also the arithmetic mean of the number of reactive functional groups per molecule. The components and their respective molar amounts are normally chosen so that the ratio A:B, where A is the molar amount of isocyanate groups and B is the sum of the molar amount of the hydroxyl groups and the molar amount of the functional groups which are able to react with isocyanates in an addition reaction, is from 0.5:1 to 2:1, preferably from 0.8:1 to 1.5, more preferably from 0.9:1 to 1.2:1. With very particular preference the ratio A:B is as close as possible to 1:1. The monomers employed carry on average usually from 1.5 to 2.5, preferably from 1.9 to 2.1, more preferably 2.0 isocyanate groups and/or functional groups which are able to react with isocyanates in an addition reaction.

The polyaddition of the synthesis components for preparing the polyurethane takes place preferably at reaction temperatures of up to 180° C., preferably up to 150° C., under atmospheric pressure or under the autogenous pressure. The preparation of polyurethanes, and of aqueous polyurethane dispersions, is known to the skilled worker.

The polyurethanes are preferably in the form of an aqueous dispersion and are used in that form.

The silane compound used in the adhesive of the invention preferably has the formula

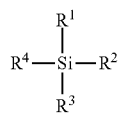

in which $R^1$ to $R^4$ each independently are an organic radical or a hydroxyl group, with the proviso that at least two of the groups $R^1$ to $R^4$ are groups selected from hydroxyl groups and alkoxy groups, and at least one of the remaining groups $R^1$ to $R^4$ is an organic radical which contains at least one functional group selected from primary amino groups, secondary amino groups, acid groups, acid anhydride groups, carbamate groups, isocyanate groups, hydroxyl groups, and epoxy groups.

Preferably two or three, more preferably three, of the groups $R^1$ to $R^4$ are a hydroxyl group or an alkoxy group. In general they are alkoxy groups; in the course of the subsequent use, the alkoxy groups then undergo hydrolysis to form hydroxyl groups, which then react further, or crosslink. The group in question is in particular a $C_1$ to $C_9$, preferably a $C_1$ to $C_6$, more preferably a $C_1$ to $C_3$ alkoxy group, with very particular preference a methoxy or ethoxy group, and in particular a methoxy group.

The remaining groups $R^1$ to $R^4$ are an organic radical whose molar weight is generally less than 500 g/mol, in particular less than 200 g/mol, with particular preference less than 150 or less than 100 g/mol. The remaining groups $R^1$ to $R^4$ may be, for example, aliphatic or aromatic hydrocarbon groups, or hydrocarbon groups containing not only aliphatic, including cycloaliphatic, but also aromatic constituents. At least one of the remaining groups $R^1$ to $R^4$ is an organic radical which comprises at least one functional group selected from a primary or secondary amino group, an acid group, acid anhydride group, carbamate group, hydroxyl group, isocyanate group or an epoxy group. Particularly preferred functional groups are the primary or secondary amino group, epoxy group, especially glycidyl group, or the carbamate group. Particular preference is given to the epoxy group, especially glycidyl group. The remaining groups $R^1$ to $R^4$ may also comprise two or more functional groups, examples being two primary amino groups, two secondary amino groups, or one primary and one secondary amino group.

In preferred silanes, three of the radicals $R^1$ to $R^4$ are a hydroxyl or alkoxy group (preferably alkoxy group; see above) and the one remaining radical is an organic radical having at least one functional group. Likewise preferred are silanes in which two of the radicals $R^1$ to $R^4$ are a hydroxyl or alkoxy group (preferably alkoxy group; see above) and the two remaining radicals are each an organic radical having at least one functional group. Particular preference is given to glycidyloxyalkyltrialkoxysilanes having in each case 1 to 5 C atoms in the alkyl and alkoxy groups. Examples of suitable silanes include 3-glycidyloxypropyltrimethoxysilane, 3-glycidyloxypropyl-triethoxysilane, N-(2-aminoethyl)-3-aminopropyltrimethoxysilane, 3-(triethoxysilyl)-propylsuccinic anhydride, and N-trimethoxysilylmethyl-O-methylcarbamate.

Suitable silanes are, in particular, of low molecular weight and have a molar weight below 5000, in particular below 2000, more preferably below 1000, and very preferably below 500 g/mol; the molar weight is generally above 50, in particular above 100, or 150 g/mol.

The silane compounds are used preferably in amounts of more than 0.2 part, more particularly more than 1 part or more than 2 parts by weight per 100 parts by weight of polyurethane, and preferably not more than 30, more particularly not more than 20, with particular preference not more than 10 parts by weight per 100 parts by weight of polyurethane.

A major constituent of the first adhesive component are the polyurethanes as binders. The first adhesive component is composed preferably to an extent of at least 20%, more preferably at least 30%, very preferably at least 40%, and more particularly at least 50% by weight, or to an extent of at least 70% by weight, of the polyurethanes, based on the solids content, i.e., without water or other solvents which are liquid at 21° C. and 1 bar. The first adhesive component is aqueous—that is, it comprises water as sole or predominant solvent or dispersion medium.

The first adhesive component may be composed solely of the polyurethanes and the silane compound, apart from water or other solvents which escape on drying. Alternatively it may also comprise further additives, examples being further binders, stabilizers, fillers, thickeners, wetting assistants, defoamers, crosslinkers, aging inhibitors, fungicides, pigments, soluble dyes, matting agents, and neutralizing agents. Further additives may be added in a simple way to the polyurethane, or to the aqueous dispersion of the polyurethane. Suitable stabilizers are in principle those stabilizers commonly used for aqueous dispersions. Very storage-stable polyurethane dispersion compositions are obtained using stabilizers selected from the group encompassing wetting agents, cellulose, polyvinyl alcohol, polyvinylpyrrolidone, and mixtures thereof.

Contemplated as further binders which can be used in a mixture with the polyurethanes are, in particular, free-radically polymerized polymers, preferably in the form of their aqueous dispersions. Such polymers are composed preferably to an extent of at least 60% by weight of what are called principal monomers, selected from $C_1$ to $C_{20}$ alkyl(meth)acrylates, vinyl esters of carboxylic acids comprising up to 20 C atoms, vinylaromatics having up to 20 C atoms, ethylenically unsaturated nitriles, vinyl halides, vinyl ethers of alcohols comprising 1 to 10 C atoms, aliphatic hydrocarbons having 2 to 8 C atoms and one or two double bonds, or mixtures of these monomers. Particularly noteworthy polymers are those constructed to an extent of more than 60% by weight from $C_1$-$C_{20}$ alkyl(meth)acrylates, i.e., (polyacrylates in short), or those which are composed to an extent of more than 60% by weight, for example even 100% by weight, of vinyl esters, particularly of vinyl acetate and ethylene (vinyl acetate-ethylene copolymer, EVA), or those which are composed to an extent of more than 60% by weight of styrene and 1,3-butadiene, i.e., styrene/butadiene copolymers, more particularly carboxylated styrene/butadiene copolymers. Carboxylated styrene/butadiene copolymers are formed from styrene, butadiene, and at least one ethylenically unsaturated, free-radically polymerizable monomer having at least one carboxyl group, examples being acrylic acid, methacrylic acid, fumaric acid, itaconic acid, etc., preferably acrylic acid. Aqueous dispersions of copolymers consisting of 15-25% by weight of ethylene and 75-85% by weight of vinyl acetate are particularly preferred for use as additional binder.

In one particular embodiment the adhesive contains no further binder other than the polyurethanes. In another embodiment the adhesive contains 10 to 30 parts, or 20 to 30 parts, by weight, based on the sum of all of the polymers of the adhesive, of binders, different from polyurethanes, these binders being preferably ethylene/vinyl acetate copolymers or styrene/butadiene copolymers.

The further constituents of the adhesive may also include, for example, further crosslinkers. Suitable examples include chemically blocked isocyanates, encapsulated isocyanates, encapsulated uretdiones, biurets or allophanates, or compounds with carbodiimide groups. The additional crosslinker may be attached to the polyurethane or else may be a compound which is dissolved or dispersed in the polyurethane. The adhesive does not need any further crosslinkers in order to achieve the desired properties, and preferably, therefore, the adhesive also contains no further crosslinkers.

Particularly advantageous compositions are those which are free from organic solvents, more particularly free from what are known as VOCs (volatile organic compounds) and/or free from plasticizers. Both plasticizers and organic solvents are disadvantageous from the standpoints of environmental toxicology and occupational hygiene. Plasticizers may migrate to the surface and lead to failure of an adhesive bond, or may make the surface tacky, leading to swelling of the adhesive joints.

Solvents as well are unwanted, since, first, they may pose an additional hazard potential on heating and on application of the adhesive, and second because they too may migrate and, over a long time, may be given off to the environment and to materials which are in contact with the adhesive, and may adversely affect these systems, and/or may lead to failure of the adhesive bond. Consequently the first adhesive component is preferably a purely aqueous system with water as sole solvent or sole dispersion medium. The solids content, i.e., the amount of all of the constituents apart from water or other substances which are liquid at 21° C. and 1 bar, is preferably between 20% and 80% by weight.

The adhesive of the invention can be used as a two-component (2K) adhesive. In the case of a 2K adhesive, a further additive, generally a crosslinker, in the present case the silane, is added prior to use. The adhesive of the invention is particularly suitable as a laminating adhesive, more particularly for producing composites by permanent adhesive bonding of extensive, flexible films/foils to solid shaped bodies as the substrate. The flexible films/foils are selected more particularly from polymer films and metal foils. They are adhered to the solid shaped bodies, examples being shaped parts composed of metal, painted metal, wood, woodbase, fiber materials or plastic. The shaped parts may comprise furniture or furniture parts, i.e., constituent parts of furniture.

The invention also provides a method of producing film/foil-coated furniture or furniture parts, where
 a) a first adhesive component of the invention, as described above, and a second adhesive component of the invention, as described above, a film/foil, and, as substrate a piece of furniture or a part of a piece of furniture are made available,
 b) the adhesive components are mixed and the mixture is applied to the film/foil and/or to the substrate, and
 c) subsequently the film/foil is bonded to the substrate under pressure and/or temperature increase.

The film/foil-coated furniture manufactured according to the present invention comprises composites. The composites may additionally have primer layers to promote adhesion between film/foil and adhesive layer and/or between substrate and adhesive layer. The films/foils and substrates to be bonded may have been pretreated with adhesion promoters. Owing to the already good adhesion properties of adhesives of the invention, however, the application of primers is not absolutely necessary.

Particularly preferred films/foils are polymer films. Polymer films are, more particularly, flexible, substantially two-dimensional plastics in a thickness of 0.05 millimeter to 1 millimeter, preferably from 0.25 to 0.4 mm, which can be rolled up. Polymeric films of this kind are produced typically by coating, casting, extruding or particularly preferably by calendering, and are typically available commercially in rolls or are produced on site. They may be of single-layer or multilayer construction. The plastic of the polymer films is preferably a thermoplastic, e.g., polyesters, such as polyethylene terephthalate (PET), thermoplastic polyolefins (TPO) such as polyethylene, polypropylene, polyvinyl chloride, especially plasticized PVC, polyacetates, ethylene/vinyl acetate copolymers (EVA), ASA (acrylonitrile/styrene/acrylic ester copolymers), PUR (polyurethane), PA (polyamide), poly(meth)acrylates, polycarbonates, or their plastics alloys. Particular preference is given to hard PVC and thermoplastic polyethylene terephthalate (PET).

The furniture parts may also be moldings which are constructed from synthetic or natural fibers or chips bound together to form a molding by a binder. The moldings may have any desired shape. Particular preference is given to medium density wood fiber (MDF) board.

The films/foils and substrates can be coated with the adhesive by customary application techniques, as for example by spraying, spreading, knife coating, die application, roll application or casting application methods. Spray application is preferred.

The amount of adhesive applied is preferably 0.5 to 100 g/m2, more preferably 2 to 80 g/m2, very preferably 10 to 70 g/m2, based on adhesive. Preferably only the film/foil or only the substrate is coated on one side. Also suitable, however, is the coating of both units to be bonded, i.e. of film/foil and substrate. Following the coating operation, there is typically a drying operation, preferably at room temperature or temperatures up to 80° C., in order to remove water or other solvents.

The film/foil coated with one or two adhesive components or the coated substrate may be stored prior to adhesive bonding. Flexible films/foils can be wound up into rolls, for example. For adhesive bonding, the parts to be bonded are joined. The adhesive is thermally activated. The temperature in the layer of adhesive is preferably at least 30° C. or at least 40° C., e.g., from 30 to 200° C., or from 40 to 180° C. A particular advantage of the present invention resides in good activatability of the adhesive at temperatures below the temperature range of 60-70° C. used with conventional adhesives as well, for example at temperatures of not more than 55° C. or not more than 50° C. or not more than 40° C.

Bonding is accomplished preferably under pressure. For this purpose, for example, the parts to be bonded may be pressed together with a pressure of at least 0.005 or at least 0.01 or at least 0.08 N/mm$^2$, e.g., 0.005 to 5 N/mm$^2$ or 0.01 to 0.8 N/mm$^2$. The pressure applied may be generated, for example, by the generation of an underpressure between film/foil and substrate, and/or by means of air pressure.

The composites obtained feature high mechanical strength even at elevated temperatures (heat stability).

The process of the present invention is particularly important for the manufacture of furniture front MDF board laminated with films/foils, particularly with decorative films/foils. The so-called 3D pressing process in particular is employed for this purpose. The adhesive components are mixed with each other and applied to the shaped body, for example an MDF board panel. This is followed, if appropriate, by a drying operation, for example at room temperature or in a drying duct at, for example, 40-50° C. The dried adhesive is thermoactivated by means of the preheated film/foil and pressed onto the substrate, for example under vacuum and/or by means of air pressure.

The films/foils utilized here are in many cases decorative plastic films and may have a surface structure. This surface structure on the plastics film may be introduced by embossing, for example, before, during or after adhesive bonding.

EXAMPLES

All percentages are given by weight unless indicated otherwise. The specifying of a content refers to the content in aqueous solution or dispersion. The viscosity can be determined in accordance with DIN EN ISO 3219 at a temperature of 23° C. using a rotational viscometer.

Ingredients:
Silane 1: 3-Glycidyloxypropyltrimethoxysilane, available as Geniosil® GF 80 (Wacker-Chemie GmbH)
Silane 2: 3-Glycidoxypropyltriethoxysilane, available as Geniosil® GF 82 (Wacker-Chemie GmbH)
Other crosslinkers (for comparison):
Basonat® F 200 WD, a self-emulsifying isocyanate marketed by BASF SE for crosslinking aqueous dispersions.
Polyurethane Dispersions:
Luphen® D 200 A:
aqueous dispersion of a polyurethane with units derived from polyester diols, marketed by BASF SE for industrial lamination.
PU-1:
dispersion of a polyurethane prepared from poly(tetrahydrofuran) with molecular weight Mn about 2000, dimethylolpropionic acid, isophorone diisocyanate and isophoronediamine, neutralized with triethylamine; solids content 50% by weight, K value 40, viscosity 68 mPas, pH 6.8.
PU-2:
dispersion of a polyurethane prepared from poly(propylene oxide) with molecular weight Mn about 2000, dimethylolpropionic acid, neopentyl glycol, tolylene diisocyanate, neutralized with NaOH; solids content 40% by weight, K value 47, viscosity 167 mPas, pH 7.6.
Preparation of Adhesives:
12.5 parts by weight of crosslinker (solid, without water, solvent) per 100 parts by weight of polyurethane (solid, without water) were stirred into the polyurethane dispersions.

| Adhesive | Polyester-polyurethane[1] | Polyether-polyurethane[1] | Crosslinker |
|---|---|---|---|
| K1 | Luphen ® D 200 A (50%) | PU-1 (50%) | Silane 1 |
| K2 | Luphen ® D 200 A (80%) | PU-1 (20%) | Silane 1 |
| K3 | Luphen ® D 200 A (80%) | PU-2 (20%) | Silane 1 |
| C1 | Luphen ® D 200 A | — | — |
| C2 | Luphen ® D 200 A | — | Basonat ® F200WD |
| C3 | Luphen ® D 200 A | — | Silane 1 |
| C4 | Luphen ® D 200 A | — | Silane 2 |
| C5 | — | PU-1 | Silane 1 |

[1]amounts in percent by weight, based on total amount of polyurethanes

Testing of Heat Resistance:
38-40 g/m² (solids) of the adhesive were sprayed onto a fiber molding with a three-dimensional surface, as used for producing furniture moldings, and dried. A commercial vacuum thermoforming press (Bürkle Thermoformer) was used to laminate an unplasticized PVC furniture veneer (Roxan type 5371744 Taunus beech) on. Lamination was effected at a hotplate temperature of 121° C. and a pressure of 4.5 bar; the pressure was maintained for 45 seconds. Vacuum time was about 6 s. The lamination with the veneer extends right to the edge of the molding obtained.

The laminate of molding and veneer was initially stored at room temperature for 7 days. This was followed by storage at 75° C. to 90° C., the storage temperature being raised by 5° C. every hour, starting at 75° C. After every hour, the edges of the molding were measured to determine whether and to what extent the laminated veneer had shrunk, i.e., how many mm of the veneer edge had moved away from the edge of the molding toward the center of the test specimen. The smaller this value, the better the heat resistance.

TABLE 1

Shrinkage of veneer in millimeters

| Adhesive | 75° C. | 80° C. | 85° C. | 90° C. |
|---|---|---|---|---|
| K1 | 0.2 | 0.2 | 0.3 | 0.5 |
| K2 | 0.2 | 0.4 | 0.5 | 0.5 |
| K3 | 0.2 | 0.3 | 0.4 | 0.5 |
| C1 | 1 | 2 | 2 | 3 |
| C2 | 0.3 | 0.4 | 0.6 | 0.7 |
| C3 | 0.4 | 0.5 | 0.6 | 0.7 |
| C4 | 0.5 | 0.7 | 0.8 | 0.8 |
| C5 | 0.6 | 0.7 | detached | detached |

Table 1 shows that inventive adhesives K1 to K3 give better results than the comparative compositions C1 to C5.

Testing of Activation Temperatures

An unplasticized PVC furniture veneer (Roxan type 5371744 Taunus beech) is coated with the in-test adhesive using a 1 mm wire-wound blade and dried at room temperature (20° C.) for 1 to 2 hours. The coated veneers are given a sensory examination by testing to see whether they are tacky to the touch at room temperature (20° C.). The coated veneers are pressed for 30 seconds at a pressure of 0.40 N/mm² in a heated press together with a second piece of unplasticized PVC veneer (Roxan type 5371744 Taunus beech) at different temperatures (35, 40 and 45° C.). The peel strength of the test specimens thus obtained is tested 1 minute after pressing and reported in N/5 cm.

Peel Strength is Determined as Follows:
Test strips 5 cm wide are prepared. The test is carried out in a tensile tester under standard atmospheric conditions. After the predetermined dwell time has elapsed, the test strip is peeled off halfway, from the bottom end, and turned upward at an angle of 180°. The end of the test strip that is now free is clamped into the tensile tester and the test strip is peeled off at an angle of 180 degrees at a machine speed of 300 mm/minute. The test substrate is renewed after every measurement. At least 3 individual measurements are carried out. The test results are reported in N/5 cm width.

TABLE 2

Tackiness at room temperature and peel strength in N/5 cm at various activation temperatures

| Adhesive | Tacky to the touch | 35° C. | 40° C. | 45° C. |
|---|---|---|---|---|
| K1 | no | 27 | 64 | 61 |
| K2 | no | 2 | 61 | 67 |
| C3 | no | 0.2 | 4 | 15 |
| C5 | yes | 43 | 47 | 52 |

Table 2 shows that K1, K2 and C3 are not tacky to the touch at room temperature. C5 is tacky, which is a technical disadvantage, particularly with regard to the production of non-blocking precoated veneers. Adhesive C3 develops sufficient peel strength only at temperatures >45° C. to be considered sufficiently activated. K1 and K2 are sufficiently activatable at 40° C. and give a much higher peel strength. K1 is even activatable at 35°. C5 shows the highest peel strength at 35° C., but has technical disadvantages due to the tackiness at room temperature. Inventive adhesives K1 and K2 are activatable at low temperatures, but at the same time not tacky at room temperature.

The invention claimed is:

1. A method of producing film/foil-coated furniture or furniture parts, comprising
   a) preparing a first aqueous adhesive component and a second adhesive component, a film/foil, and as substrate a piece of furniture or a part of a piece of furniture,
   b) mixing the first aqueous adhesive component and second adhesive component to form a mixture and applying the mixture to the film/foil and/or to the substrate, and
   c) bonding subsequently the film/foil to the substrate under pressure and/or temperature increase;
   wherein the first aqueous adhesive component comprises at least one first polyurethane and at least one second polyurethane other than the first polyurethane,
   the first polyurethane comprises units obtained from polyester diols and the second polyurethane comprising units obtained from polyether diols,
   and at least one of the two polyurethanes comprises carboxyl groups, wherein
   a weight quantity ratio of a sum total of all units obtained from polyester diols to a sum total of all units obtained from polyether diols is in the range from 1:9 to 9:1, and
   wherein the second adhesive component comprises at least one silane compound reactive toward carboxyl groups.

2. The method according to claim 1, wherein the first aqueous adhesive component comprises
   (a) 20-80 parts by weight of the at least one first polyurethane with units obtained from polyester diols and without units obtained from polyether diols,
   (b) 10-70 parts by weight of the at least one second polyurethane with units obtained from polyether diols and without units obtained from polyester diols, and
   c) 0-60 parts by weight of further polymers other than polyurethanes.

3. The method according to claim 2, wherein the first polyurethane is synthesized from
   a) diisocyanates,
   b) polyester diols having a molecular weight of greater than 500 to 5000 g/mol,
   c) diols comprising carboxylic acid groups, and
   d) optionally further, non-a)-c), monofunctional or polyfunctional compounds having reactive groups selected from the group consisting of alcoholic hydroxyl groups, primary amino groups, secondary amino groups, and isocyanate groups, and the second polyurethane is synthesized from
   a) diisocyanates,
   b) polyether diols having a molecular weight of 240 to 5000 g/mol,
   c) diols comprising carboxylic acid groups, and
   d) optionally further, non-a)-c), monofunctional or polyfunctional compounds having reactive groups selected from the group consisting of alcoholic hydroxyl groups, primary amino groups, secondary amino groups, and isocyanate groups.

4. The method according to claim 1, wherein the polyether diols are selected from the group consisting of polytetrahydrofuran and polypropylene oxide and the polyester diols are selected from the group consisting of reaction products of dihydric alcohols with dibasic carboxylic acids, and lactone-based polyester diols.

5. The method according to claim 2, wherein 10 to 30 parts by weight of ethylene-vinyl acetate copolymers are present as the polymers other than polyurethanes.

6. The method according to claim 1, wherein the silane compound has a formula

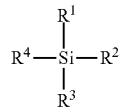

in which $R^1$ to $R^4$ each independently are an organic radical or a hydroxyl group, with the proviso that at least two of the groups $R^1$ to $R^4$ are groups selected from the group consisting of hydroxyl groups and alkoxy groups, and at least one of the remaining groups $R^1$ to $R^4$ is an organic radical which comprises at least one functional group selected from the group consisting of primary amino groups, secondary amino groups, acid groups, acid anhydride groups, carbamate groups, isocyanate groups, hydroxyl groups, and epoxy groups.

7. The method according to claim 6, wherein two or three of the groups $R^1$ to $R^4$ are an alkoxy group.

8. The method according to claim 6, wherein the silane compound is a glycidyloxyalkyltrialkoxysilane having in each case 1 to 5 C atoms in the alkyl groups and in the alkoxy groups.

9. The method according to claim 1, wherein more than 0.2 and not more than 30 parts by weight of the silane are used per 100 parts by weight of polyurethanes.

10. The method according to claim 1, wherein the first polyurethane is crystalline in the pure state and has a melting point in the range of from 30 to 150° C.

11. The method according to claim 1, wherein the first aqueous adhesive component consists of polyurethanes to an extent of at least 40% by weight, based on the solids content.

* * * * *